United States Patent
Singh et al.

(10) Patent No.: US 10,933,743 B2
(45) Date of Patent: Mar. 2, 2021

(54) ELECTRIC POWER TAKE-OFF ON A HYBRID ELECTRIC TRANSMISSION

(71) Applicants: Tejinder Singh, Dexter, MI (US); James E Adams, Shelby Township, MI (US); Robert E Lee, Brighton, MI (US)

(72) Inventors: Tejinder Singh, Dexter, MI (US); James E Adams, Shelby Township, MI (US); Robert E Lee, Brighton, MI (US)

(73) Assignee: FCA US LLC, Auburn Hills, MI (US)

( * ) Notice: Subject to any disclaimer, the term of this patent is extended or adjusted under 35 U.S.C. 154(b) by 185 days.

(21) Appl. No.: 16/126,452

(22) Filed: Sep. 10, 2018

(65) Prior Publication Data
US 2019/0077259 A1    Mar. 14, 2019

Related U.S. Application Data

(60) Provisional application No. 62/556,622, filed on Sep. 11, 2017.

(51) Int. Cl.
| | |
|---|---|
| *B60K 25/06* | (2006.01) |
| *B60K 6/38* | (2007.10) |
| *B60K 6/42* | (2007.10) |
| *B60K 6/405* | (2007.10) |
| *B60K 17/28* | (2006.01) |

(Continued)

(52) U.S. Cl.
CPC .............. *B60K 25/06* (2013.01); *B60K 6/365* (2013.01); *B60K 6/38* (2013.01); *B60K 6/383* (2013.01); *B60K 6/387* (2013.01); *B60K 6/40* (2013.01); *B60K 6/405* (2013.01); *B60K 6/42* (2013.01); *B60K 6/442* (2013.01); *B60K 6/547* (2013.01); *B60K 17/28* (2013.01); *B60W 10/08* (2013.01); *B60W 20/40* (2013.01); *B60W 30/1888* (2013.01); *F16H 3/724* (2013.01); *F16H 3/727* (2013.01); *B60K 2006/381* (2013.01); *B60K 2025/005* (2013.01); *B60Y 2200/14* (2013.01); *F16H 3/66* (2013.01); *F16H 3/666* (2013.01); *F16H 61/0028* (2013.01); *F16H 2200/0052* (2013.01); *F16H 2200/201* (2013.01); *F16H 2200/2041* (2013.01);

(Continued)

(58) Field of Classification Search
CPC .......... B60K 6/365; B60K 6/38; B60K 6/387; B60K 6/405; B60K 6/42; B60K 6/442; B60K 6/445; B60K 17/28; B60K 25/06; B60K 2025/005; B60W 20/40
See application file for complete search history.

(56) References Cited

U.S. PATENT DOCUMENTS

| | | | |
|---|---|---|---|
| 5,669,842 A | 9/1997 | Schmidt | |
| 7,104,920 B2 * | 9/2006 | Beaty ...................... | B60K 6/48 477/5 |

(Continued)

*Primary Examiner* — Barry Gooden, Jr.
(74) *Attorney, Agent, or Firm* — Ralph E Smith

(57) ABSTRACT

A power-take off (PTO) system for a vehicle having a powertrain comprising an engine and a hybrid electric transmission includes a PTO device configured to provide power to an accessory load of the vehicle, a housing for a gear clutch of the transmission, the housing being formed of steel, needle bearings for the gear clutch, and a gear defined by or attached to an outer surface of the housing, wherein at least one electric motor of the transmission is configured to drive the PTO device via the gear clutch and the gear while the engine is disconnected from the transmission or is shut off.

16 Claims, 3 Drawing Sheets

(51) Int. Cl.
  *B60W 20/40* (2016.01)
  *B60K 6/547* (2007.10)
  *B60K 6/383* (2007.10)
  *B60K 6/365* (2007.10)
  *B60K 6/442* (2007.10)
  *B60K 6/40* (2007.10)
  *B60K 6/387* (2007.10)
  *B60W 10/08* (2006.01)
  *B60W 30/188* (2012.01)
  *F16H 3/72* (2006.01)
  *F16H 3/66* (2006.01)
  *F16H 61/00* (2006.01)
  *B60K 25/00* (2006.01)

(52) U.S. Cl.
  CPC .............. *F16H 2200/2043* (2013.01); *F16H 2200/2066* (2013.01); *F16H 2200/2082* (2013.01)

(56) References Cited

U.S. PATENT DOCUMENTS

| | | | |
|---|---|---|---|
| 8,103,395 B2 | 1/2012 | Bissontz | |
| 8,575,802 B2* | 11/2013 | Lueckenotto | F02N 15/067 310/90 |
| 2010/0219007 A1* | 9/2010 | Dalum | B60L 1/003 180/65.22 |
| 2014/0080648 A1 | 3/2014 | Kimes | |
| 2014/0171260 A1* | 6/2014 | Dalum | B60K 6/26 477/5 |
| 2015/0135863 A1* | 5/2015 | Dalum | B60K 17/28 74/11 |
| 2018/0010668 A1* | 1/2018 | Hirano | F16H 37/02 |
| 2018/0154773 A1* | 6/2018 | Dalum | B60K 25/00 |
| 2019/0140474 A1* | 5/2019 | Stoltz | H02J 7/16 |

* cited by examiner

ELECTRIC POWER TAKE-OFF ON A HYBRID ELECTRIC TRANSMISSION

CROSS REFERENCE TO RELATED APPLICATION

This application claims benefit of U.S. Provisional Application No. 62/556,622, filed on Sep. 11, 2017. The disclosure of the above application is incorporated herein by reference in its entirety.

FIELD

The present application generally relates to hybrid vehicle transmissions and, more particularly, to a power take-off (PTO) on a hybrid electric transmission.

BACKGROUND

A power take-off (PTO) device (e.g., a mechanical gearbox) attaches to a transmission of a vehicle and is used to transfer power of the vehicle propulsion system (e.g., an engine) to auxiliary components. The PTO device provides power in the form of a rotating shaft directly to the driven auxiliary component (e.g., pumps, generators, etc.). PTO devices are typically limited to commercial vehicle applications, such as on heavy duty truck transmissions, where a very large amount of power is needed to power the auxiliary components. Non-limiting examples of the implementations of PTO devices on heavy duty truck transmissions include running a water pump on a fire engine or water truck, raising a dump truck bed, operating a winch on a tow truck, and operating a compactor on a garbage truck. Passenger vehicles typically include only low-voltage accessory loads, which are capable of being powered by an alternator system that is driven by the vehicle's engine. While such alternator systems do work well for their intended purpose, there exists an opportunity for improvement in the relevant art.

SUMMARY

According to one example aspect of the invention, a power-take off (PTO) system for a vehicle having a powertrain comprising an engine and a hybrid electric transmission is presented. In one exemplary implementation, the PTO system comprises: a PTO device configured to provide power to an accessory load of the vehicle, a housing for a gear clutch of the transmission, the housing being formed of steel, needle bearings for the gear clutch, and a gear defined by or attached to an outer surface of the housing, wherein at least one electric motor of the transmission is configured to drive the PTO device via the gear clutch and the gear while the engine is disconnected from the transmission or is shut off.

In some implementations, the transmission comprises: a first electric motor connected to a first node, a disconnect clutch connected between the first node and the engine, a second electric motor connected to a second node, wherein the gear clutch is connected to the second node, and a launch clutch connected between the first node and the second node. In some implementations, the PTO system further comprises a controller configured to control the disconnect clutch and the launch clutch to control the driving of the PTO device via at least one of the first electric motor, the second electric motor, and the engine. In some implementations, the controller is configured to disengage the launch clutch and the disconnect clutch and drive the PTO device via the gear clutch using the second electric motor while the engine is shut off. In some implementations, the controller is further configured to control the second electric motor to recharge a battery system that powers the first electric motor and the second electric motor while the launch clutch and the disconnect clutch are disengaged and the second electric motor is driving the PTO device via the gear clutch.

In some implementations, the controller is configured to engage the launch clutch and disengage the disconnect clutch and drive the PTO device via the gear clutch using the first and second electric motors while the engine is shut off. In some implementations, the controller is configured to engage both the launch clutch and the disconnect clutch and drive the PTO device via the gear clutch using the first and second electric motors and the engine. In some implementations, the controller is configured to disengage the launch clutch and engage the disconnect clutch and drive the PTO device via the gear clutch using the second electric motor and to drive the first electric motor using the engine such that the first electric motor acts as a generator and recharges a battery system that powers the first electric motor and the second electric motor. In some implementations, the steel replaces aluminum for the housing for the gear clutch and the needle bearings replace bushings for the gear clutch due to an increased torque load on the gear clutch and its housing when driving the PTO device.

According to another example aspect of the invention, a hybrid electric transmission system for a vehicle having an engine is presented. In one exemplary implementation, the system comprises (i) a hybrid electric transmission comprising a first electric motor connected to a first node, a disconnect clutch connected between the engine and the first node, a second electric motor connected to a second node, a launch clutch connected between the first and second nodes, a gear clutch connected to the second node, the gear clutch comprising a housing formed of steel, a gear defined by an outer surface of the housing or attached about a perimeter of the housing, and needle bearings, (ii) a PTO device driven by the gear of the gear clutch housing, the PTO device configured to provide at least one of mechanical power and electrical power to an accessory load of the vehicle, (iii) a battery system configured to provide electrical power to the first and second electric motors, and (iv) a controller configured to control the disconnect clutch and the launch clutch to control which of the first electric motor, the second electric motor, and the engine is driving the PTO device via the gear clutch.

In some implementations, the controller is configured to control to disengage the launch clutch and the disconnect clutch and drive the PTO device via the gear clutch using the second electric motor while the engine is shut off. In some implementations, the controller is further configured to control the second electric motor to recharge the battery system while the launch clutch and the disconnect clutch are disengaged and the second electric motor is driving the PTO device via the gear clutch. In some implementations, the controller is configured to engage the launch clutch and disengage the disconnect clutch and drive the PTO device via the gear clutch using the first and second electric motors while the engine is shut off.

In some implementations, the controller is configured to engage both the launch clutch and the disconnect clutch and drive the PTO device via the gear clutch using the first and second electric motors and the engine. In some implementations, the controller is configured to disengage the launch clutch and engage the disconnect clutch and drive the PTO device via the gear clutch using the second electric motor and to drive the first electric motor using the engine such that the first electric motor acts as a generator and recharges the battery system. In some implementations, the steel replaces aluminum for the housing for the gear clutch and the needle bearings replace bushings for the gear clutch due to an increased torque load on the gear clutch and its housing when driving the PTO device.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, passenger vehicles typically include an alternator system that is driven by the vehicle's engine and generates power for auxiliary components of the vehicle (e.g., an air conditioner). Some geographical areas are "zero emissions" zones and/or have noise restrictions. While running, the engine produces audible noise and emissions, and thus the engine should not be running in these geographical areas. Some hybrid vehicles are capable of temporarily shutting off their engine and propelling the vehicle using other means, e.g., an electric motor. When these accessory loads need power, or when the state of charge (SOC) of a battery system powering the engine decreases, the engine needs to be turned on, which would preclude operating the vehicle in these geographical areas. Thus, while conventional alternator systems work for their intended purpose, there exists an opportunity for improvement in the relevant art. Accordingly, a power take-off (PTO) system integrated with a hybrid electric transmission of a vehicle is presented.

Figure 1:
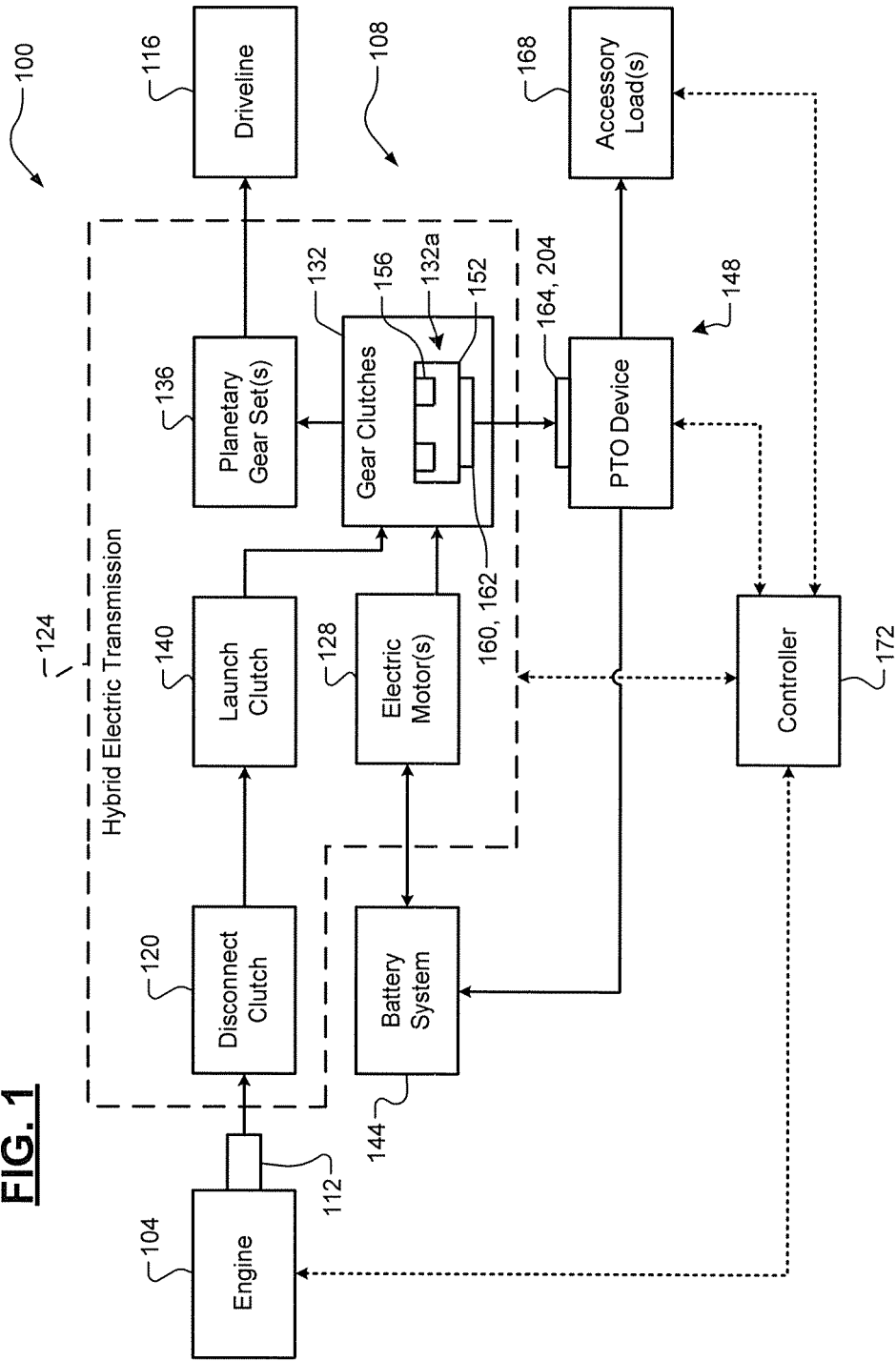
FIG. 1 is a functional diagram of a vehicle having an engine and an example power take-off (PTO) system integrated with a hybrid electric transmission according to some implementations of the present disclosure.

Referring now to FIG. 1, a functional block diagram of a vehicle 100 comprising an engine 104 and an example PTO system 108 is illustrated. The engine 104 is any suitable type of engine 104 (spark ignition, diesel, etc.) configured to combust an air/fuel mixture to generate drive torque at a crankshaft 112. It will be appreciated that the engine 104 could include a starter system (not shown), e.g., a belt-driven starter (BSG) unit, that is capable of quickly restarting the engine 104 after a stop procedure. The drive torque at the crankshaft 112 is selectively transferred to a driveline 116 via a hybrid electric transmission 124 (hereinafter, "transmission 124"). The engine 104 and the transmission 124 can collectively be referred to as a powertrain of the vehicle 100. The transmission 124 comprises a disconnect clutch 120, a launch clutch 140, one or more electric motors 128 that are also configured to selectively provide drive torque to the driveline 116 via a gear clutches 132 that are utilized to engage a particular gear ratio, and one or more planetary gear sets 136. The disconnect clutch 120 and the launch clutch 140 are connected between the engine 104 and the gear clutches 132 for selectively providing the drive torque from the crankshaft 112 to the driveline 116 via the planetary gear sets 136. The electric motor(s) 128 are powered by electrical energy provided by a battery system 144.

The PTO system 108 includes aspects of one of the gear clutches 132 (hereinafter, "gear clutch 132a") and a PTO device 148. It will be appreciated that the PTO device 148 could be any suitable device capable of taking power off of the gear clutch 132a, such as a mechanical gearbox or spline shaft. It will also be appreciated that the PTO device 148 could further include another component such as a generator for converting its received mechanical power into electrical energy. As shown, the gear clutch 132a comprises a housing 152 that houses the internal components of the gear clutch 132a (a clutch disc, a pressure plate, etc.). In contrast to conventional clutch housings, which are made of aluminum (e.g., for decreased weight), this housing 152 is made of a higher-strength material such as steel. The gear clutch 132a further comprises bearings 156. In contrast to conventional clutch bushings, these bearings 156 are higher strength (e.g., needle bearings). This is because the gear clutch 132a and its housing 152 are subject to the torque load applied thereto in driving the PTO device 148.

The housing 152 further defines an external gear 160 having a plurality of teeth 162. This gear 160 could be defined by an outer surface of the housing 152 or the gear 160 could be attached about a perimeter of the housing 152. The gear teeth 162 interact with other gear teeth 164 of another gear 204 of the PTO device 148, thereby driving a rotating shaft of the PTO device 148. This mechanical power could be used to power mechanical accessory load(s) 168, such as mechanical or fluid pumps. As previously discussed, the PTO device 148 could further comprise a generator (not shown) that converts the received mechanical power into electrical energy for powering electrical accessory load(s) 168 (e.g., an air conditioner) and/or for recharging of the battery system 144. A controller 172 controls operation of the vehicle 100, including controlling air/fuel (and optionally, spark) of the engine 104 to generate a desired drive torque at the crankshaft 112. The controller 172 also controls the clutches 120, 132, 140 of the transmission 124, the PTO device 148 for generator implementations (e.g., to control electrical energy conversion by a generator), and the accessory load(s) 168. The controller 172 can also perform a portion of the control techniques for the PTO system 108, which are described in greater detail below.

Figure 2:
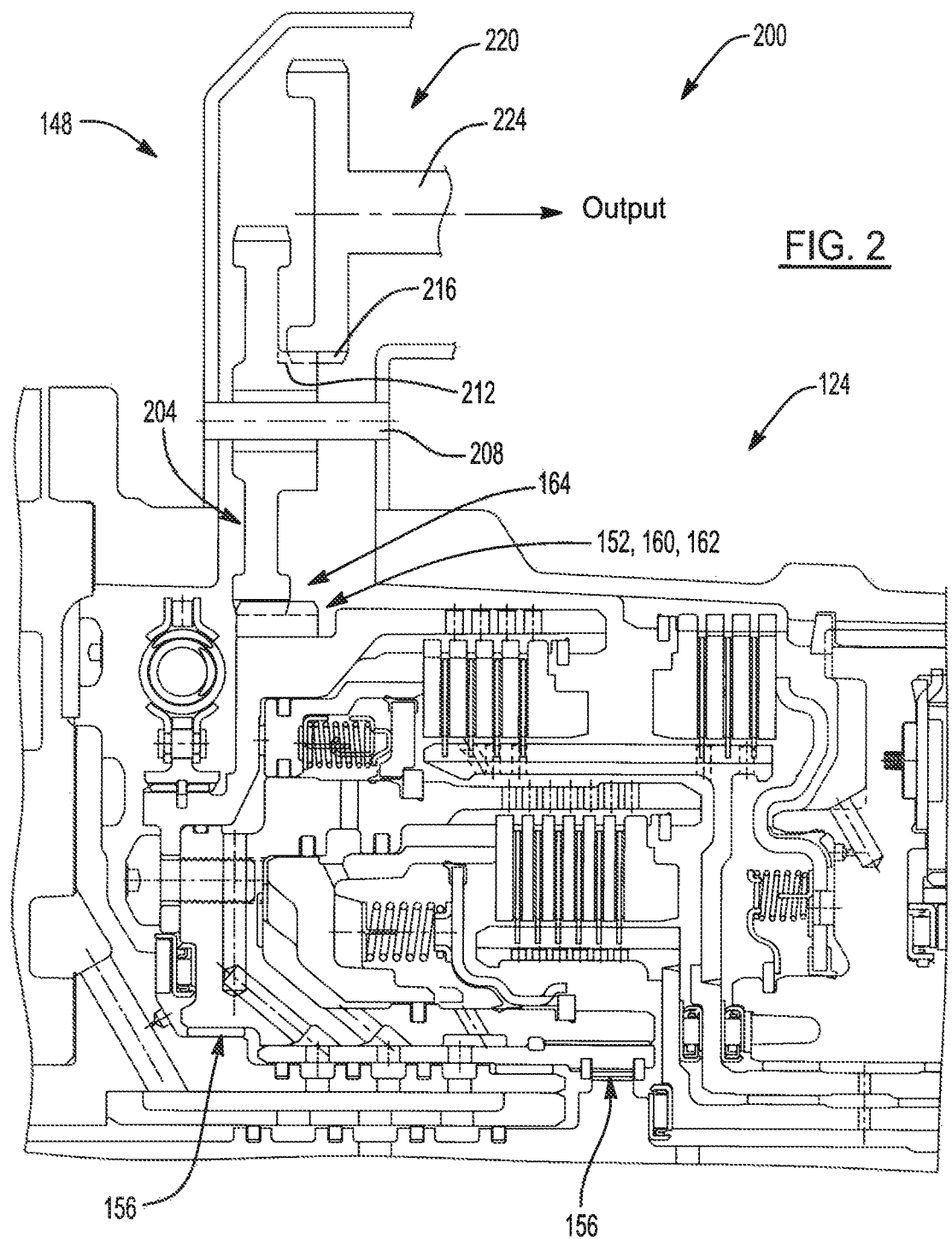
FIG. 2 is an example cross-sectional view of the PTO system integrated with the hybrid electric transmission according to the principles of the present disclosure.
Figure 3:
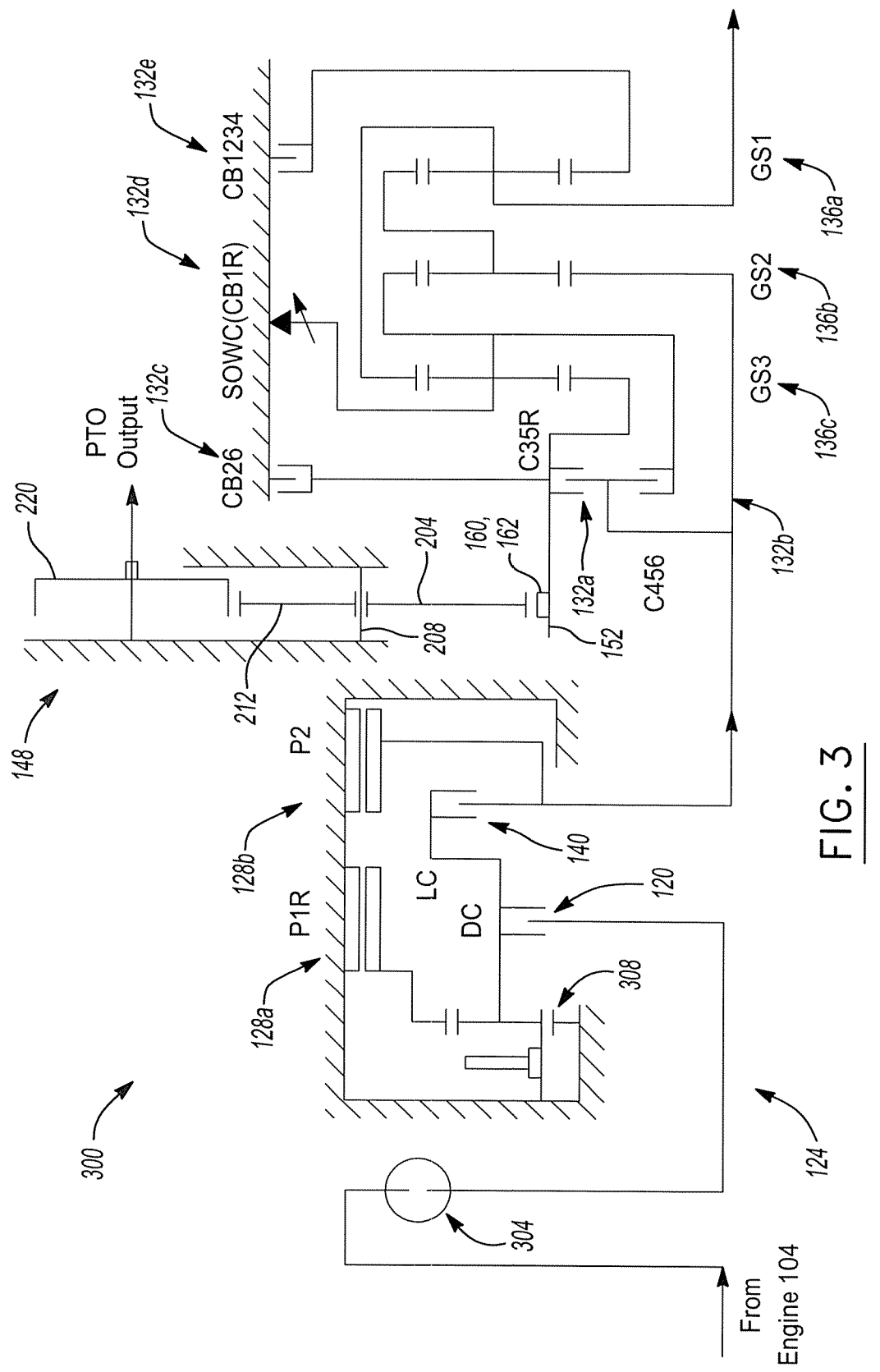
FIG. 3 is an example schematic diagram of the hybrid electric transmission according to the principles of the present disclosure

Referring now to FIGS. 2-3, an example cross-sectional view 200 of the PTO system 108 integrated with the transmission 124 and an example schematic diagram 300 of a six-speed configuration of the transmission 124 are illustrated. In FIG. 2, an external surface of the housing 152 where the gear 160 is defined or attached is illustrated. Also illustrated is a portion of the gear clutch 132a where previously-used bushings are replaced with higher strength bearings 156 (e.g., needle bearings). Gear teeth 162 associated with the clutch housing 152 physically interact or mesh with the gear teeth 164 of the gear 204 of the PTO device 148. It will be appreciated that this cross-sectional view is merely one example configuration of the PTO device 148 and there could be other suitable implementations. Gear teeth 164 of gear 204 are driven by gear teeth 162 of gear 160, causing gear 204 to rotate about a first shaft 208. Gear 204 (e.g., via another set of gear teeth 212) also physically interacts or meshes with gear teeth 216 of another gear 220 of the PTO device 148. Gear 220 rotates about a second shaft 224 and provides the output of the PTO device 148. As previously noted, this could be mechanical energy directly via shaft 220 or via another device or electrical energy converted from the mechanical energy by a generator (not shown).

In FIG. 3, the schematic diagram 300 of the transmission 124 is illustrated. A torsional damper 304 is connected between the disconnect clutch (DC)120 and the engine 104. The disconnect clutch 120 is also connected to the launch clutch (LC) 140. A first electric motor 128a (P1R) is also connected to the disconnect clutch 120. An optional gear set 308 could be arranged between the first electric motor 128a and the disconnect clutch 120. The lockup clutch 308 is also connected to a node that is shared by a second electric motor 128b (P2), the gear clutch 132a (C35R) that interacts with the PTO device 148, and another gear clutch 132b (C456). The transmission 124 further comprises gear sets 136a, 136b, and 136c and other gear clutches 132c (CB26), 132d (CB1R), e.g., a selectable one-way clutch (SOWC), and 132e (CB1234).

As shown, the second electric motor 128b is always able to provide power to the PTO system 108 via gear clutch 132a. By engaging or applying the launch clutch 140, the first electric motor 128a is connected to the same node as the second electric motor 128b and thus is also able to provide power to the PTO system 108 via gear clutch 132a. By engaging or applying both the disconnect clutch 120 and the launch clutch 140, both the engine 104 and the first electric motor 128a are connected to the same node as the second electric motor 128b and thus are both able to provide power to the PTO system 108 via gear clutch 132a. Additionally, when the engine 104 is shut off and the launch clutch 140 is disabled or not applied, the first electric motor 128a is able to operate as a generator to recharge the battery system 144, while the second electric motor 128b simultaneously provides PTO operation. Some example operating conditions for these various components are illustrated in Table 1 below.

TABLE 1

| Condition | Engine | Motor 1 | Motor 2 | DC | LC | Description |
|---|---|---|---|---|---|---|
| #1 | | | X | | | Motor 2 Driving PTO While Engine Off |
| #2 | | X | X | | X | Motors 1 and 2 Driving PTO While Engine Off |
| #3 | | Charge | X | | X | Motor 1 Charging and Motor 2 Driving PTO While Engine Off |
| #4 | X | X | X | X | X | Engine and Motors 1 and 2 All Driving PTO |
| #5 | X | Charge | X | X | X | Engine Driving Motor 1 for Charge, Motor 2 Driving PTO |
| #6 | X | | | X | X | Engine Driving PTO While Motors 1 and 2 Off |

As illustrated in Table 1 above, an "X" refers to the component being on/enabled (for engine/motors) and engaged (for clutches DC 120 and LC 140). The term "Charge" refers to the first electric motor 128b being on/enabled but acting as a generator for recharging the battery system 144. Motor 1 refers to the first electric motor 128a, Motor 2 refers to the second electric motor 128b, Engine refers to the engine 104, and PTO refers to the PTO system 108 or PTO device 148.

It will be appreciated that the system of the present disclosure could be applied to any hybrid electric transmission having at least one electric motor. As shown and discussed above, having two electric motors provides for increased flexibility (e.g., simultaneous PTO driving and battery recharging). It will also be appreciated that there are many other potential benefits of utilizing this system, including decreased noise, decreased emissions, improved fuel economy, and the ability to power external devices (e.g., while camping or traveling). It will also be appreciated that a precondition of utilizing this system as described herein could be the transmission being in a park or neutral gear.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A power-take off (PTO) system for a vehicle having a powertrain comprising an engine and a hybrid electric transmission, the PTO system comprising:
   a PTO device configured to provide power to an external accessory load of the vehicle;
   a housing for a gear clutch of the transmission; and
   a gear defined by or attached directly to an outer surface of the gear clutch housing,
   wherein at least one electric motor of the hybrid electric transmission is configured to drive the PTO device via the gear clutch and the gear while the engine is disconnected from the transmission or is shut off.

2. The PTO system of claim 1, wherein the housing for the gear clutch is formed of steel and needle bearings are provided for the gear clutch due to an increased torque load on the gear clutch and the housing when driving the PTO device coupled to the external accessory load.

3. The PTO system of claim 1, wherein the transmission comprises:
   a first electric motor;
   a second electric motor connected to the gear clutch;
   a disconnect clutch connected between the first electric motor and the engine;
   a launch clutch connected between the disconnect clutch and the second electric motor; and
   a transmission gear configured to be selectively engaged and disengaged with the gear clutch.

4. The PTO system of claim 3, further comprising a controller configured to i) control the disconnect clutch and the launch clutch to control the driving of the PTO device via at least one of the first electric motor, the second electric motor, and the engine; and ii) control the gear clutch to be disengaged with the transmission gear.

5. The PTO system of claim 4, wherein the controller is configured to engage the launch clutch and disengage the disconnect clutch and drive the PTO device via the gear clutch using the first and second electric motors while the engine is shut off.

6. The PTO system of claim 4, wherein the controller is configured to engage both the launch clutch and the disconnect clutch and drive the PTO device via the gear clutch using the first and second electric motors and the engine.

7. The PTO system of claim 4, wherein the controller is configured to disengage the launch clutch and engage the disconnect clutch and drive the PTO device via the gear clutch using the second electric motor and to drive the first electric motor using the engine such that the first electric motor acts as a generator and recharges a battery system that powers the first electric motor and the second electric motor.

8. The PTO system of claim 4, wherein the controller is configured to disengage the launch clutch and the disconnect clutch and drive the PTO device via the gear clutch using the second electric motor while the engine is shut off.

9. The PTO system of claim 8, wherein the controller is further configured to control the second electric motor to recharge a battery system that powers the first electric motor and the second electric motor while the launch clutch and the disconnect clutch are disengaged and the second electric motor is driving the PTO device via the gear clutch.

10. A hybrid electric transmission system for a vehicle having an engine, the system comprising:
   a hybrid electric transmission comprising:
      a first electric motor;
      a gear clutch;
      a second electric motor connected to the gear clutch;
      a disconnect clutch connected between the engine and the first electric motor; and
      a launch clutch connected between the disconnect clutch and the second electric motor,
      wherein the gear clutch comprises:
         a housing formed of steel; and
         a gear defined by an outer surface of the housing or attached directly to an outer perimeter of the housing;
   a power take-off (PTO) device driven by the gear of the gear clutch housing, the PTO device configured to provide at least one of mechanical power and electrical power to an external accessory load of the vehicle;
   a battery system configured to provide electrical power to the first and second electric motors; and
   a controller configured to control the disconnect clutch and the launch clutch to control which of the first electric motor, the second electric motor, and the engine is driving the PTO device via the gear clutch.

11. The system of claim 10, wherein the gear clutch is configured to be controlled by the controller to selectively engage with or disengage from a transmission gear of the transmission; and
   wherein the controller is configured to i) command disengagement of the launch clutch and the disconnect clutch and drive the PTO device via the gear clutch using the second electric motor while the engine is shut off; and ii) command the gear clutch to be disengaged from the transmission gear.

12. The system of claim 10, wherein the controller is further configured to control the second electric motor to recharge the battery system while the launch clutch and the disconnect clutch are disengaged and the second electric motor is driving the PTO device via the gear clutch.

13. The system of claim 10, wherein the controller is configured to engage the launch clutch and disengage the disconnect clutch and drive the PTO device via the gear clutch using the first and second electric motors while the engine is shut off.

14. The system of claim 10, wherein the controller is configured to engage both the launch clutch and the disconnect clutch and drive the PTO device via the gear clutch using the first and second electric motors and the engine.

15. The system of claim 10, wherein the controller is configured to disengage the launch clutch and engage the disconnect clutch and drive the PTO device via the gear clutch using the second electric motor and to drive the first electric motor using the engine such that the first electric motor acts as a generator and recharges the battery system.

16. The system of claim 10, wherein the steel gear clutch housing is utilized and needle bearings are provided for the gear clutch due to an increased torque load on the gear and the associated housing when driving the PTO device coupled to the external accessory load.

* * * * *